Patented May 23, 1933

1,910,675

UNITED STATES PATENT OFFICE

BRUNO BRUHN, OF ESSEN, GERMANY

CEMENT AND PROCESS OF PRODUCING THE SAME

No Drawing. Application filed June 21, 1929. Serial No. 372,799.

All commercial cements except the high alumina cements are calcined or sintered, but not fused. It is a generally known fact, that by sintering the mixed raw materials a good cement can only be obtained under two conditions. First of all it is imperative to grind extremely fine in order to have an absolutely uniform and homogeneous powder or slurry in which every particle of clay or shale or sand etc. is surrounded by particles of lime so that the reaction between the components may be as intense as possible. The installation and operation of the machinery for grinding, mixing and blending in modern plants are most expensive and yet the reaction between the lime and the other ingredients is far from being perfect in the sintering process. In many cements small quantities of free lime are found. If this is not the case the content of lime is often insufficient and the cement may be a mixture of various minerals some of which may be of good hydraulic value, whereas others will be of a very doubtful value owing to lack of lime.

It is furthermore imperative to keep the burning temperature and the burning time within rather narrow limits. Overburning and too long burning are just as detrimental for the quality of the cement as are underburning and too short burning. Shaft kilns, ring ovens, blast or open hearth furnaces, all of which have better heat economy than rotary kilns, cannot be used for burning powder or slurry without forming lumps, bricks or the like, thereby sacrificing the economy involved.

It is clear that all these difficulties would be avoided by fusing the raw materials. The reaction between the molten components is obviously perfect, independent of the fineness. Overburning and underburning cannot take place. Mixing and blending is very simple. Supervision is easy.

The state of the existing cement industry is comparable to the state of the steel industry before fluid steel was invented.

Many attempts have been made to melt the raw materials and especially to keep blast furnace slags in a molten condition while adding the necessary lime in order to enjoy the obvious advantages of the fusing process as against the sintering process. The failure of all these attempts may be explained by the following facts:

Modern research of cement chemistry has shown that three compounds are mainly responsible for the highest hydraulic qualities of cements, namely, tricalciumsilicate, dicalciumaluminate and dicalciumferrit. The proportion between lime on one hand and silica, alumina, ferric oxide on the other hand in these minerals is:

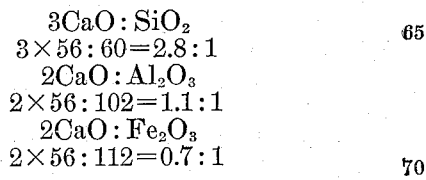

$$3CaO : SiO_2$$
$$3 \times 56 : 60 = 2.8 : 1$$
$$2CaO : Al_2O_3$$
$$2 \times 56 : 102 = 1.1 : 1$$
$$2CaO : Fe_2O_3$$
$$2 \times 56 : 112 = 0.7 : 1$$

These figures show that 2½ times as much lime is needed for saturating silica as is needed for saturating alumina and 4 times as much as for saturating iron oxide. An extremely high addition of lime is therefore necessary in order to make cement from clay, shale or similar raw materials comparatively rich in silica as they are used all over the world either in the cement or in the iron industry either directly or by the detour over blast furnace slags.

This high addition of lime has a great disadvantage. It raises the melting point of the mix to such high degrees that the temperature cannot be attained in any furnace heated with carboniferous matter as oil, gas or powdered coal even when preheated air is used.

It may be mentioned that sometimes Portland cement clinker may melt in a rotary kiln, but in that case alumina and silica from the lining will enter into the mix and will totally change and deteriorate the product.

Fluid blast furnace slags of normal composition will solidify at once when addition of lime is attempted. Even if the experiment is performed in a special furnace with a very hot flame and with preheated air, it is impossible to incorporate in the slag in a molten condition sufficient lime to saturate it and thereby to produce a material which after cooling and grinding will be a good commercial cement.

In the existing industry, therefore, slags are ground and mixed with quick lime or with Portland clinker in order to obtain a hydraulic product or the slags are treated merely as a raw material for normal Portland cement, that is they are ground, mixed with limestone, reburnt, and the clinker again ground.

All this is obviously necessary because an economic process for converting fluid slags or a fusion of natural raw materials directly into good cement has not as yet been discovered. The expensive electric furnace would be necessary unless a new and special way can be shown. Such a way is shown by the present invention which is the logical consequence of the above mentioned chemical formulas and proportions. It consists simply in decreasing the relative proportion of silica (needed for saturating much lime) by increasing the content of alumina and iron oxide (needing less lime). By this change in the composition of the raw mix the amount of lime necessary for forming a highly hydraulic product is lessened.

A low content of lime gives a low melting point and an easy flow of the melt. This is the most important point for industrial purposes. The more the silica content recedes as against the sesquioxides, and among the latter ones, the more the alumina recedes as against the iron oxide, the less lime will be necessary for saturating and the easier will it be to melt the mix with an ordinary flame of carboniferous fuel.

The iron should be present in the form of $Fe_2O_3$ because FeO being present in the cement will produce bad colors and weaken the hydraulic quality.

As in many similar instances there are (a) chemical, (b) physical, and (c) economic optima according to (a) the hydraulic features, (b) the melting point, and (c) the smallest fuel consumption. The corresponding curves are rather complex. The hereinafter mentioned approximate limits have been empirically found. The analyses are to be examples only for good cements and economic methods to produce them.

In order to give a demarcation line between the new process and the known processes as they are generally used in the industry, the following definition of the present invention may be given:

Fusing a mixture of comparatively coarse raw materials or slags containing less lime (CaO) and less silica ($SiO_2$), but more ferric oxide ($Fe_2O_3$) and/or alumina ($Al_2O_3$) than ordinary Portland cement, more lime and more ferric oxide than blast furnace slag, less alumina ($Al_2O_3$), more silica and more ferric oxide than alumina cement. The mixture is treated under non-reducing or oxidizing combustion conditions, then cooled and ground.

The limits within which a mixture of lime, silica, alumina and ferric oxide (leaving out secondary components) may be made into a good and highly hydraulic product by fusing, cooling and grinding, are to my best knowledge as follows:

The hydraulic modulus, i. e. the ratio of lime to silica plus alumina plus ferric oxide, should not be higher than 2.25 and not lower than 1.4. The lower the silica modulus is the lower should be the hydraulic modulus.

The silica modulus, i. e. the ratio of silica to alumina plus ferric oxide should not be higher than 1.8 and not lower than 0.5.

These limits of the silica modulus are only the outermost for the present invention. It is more advantageous for the practical performance of the process to limit the field somewhat more and to confine the silica modulus between 1.5 and 0.6 and it may be mentioned that the best cements have been obtained with a silica modulus between 1.2 and 0.8.

The iron modulus, i. e., the ratio of alumina to ferric oxide may vary in rather wide limits, namely from 2.0 to 0.5, provided the silica modulus is within the limits of about 1.5 to 0.6. The following rule should, however, be observed. A mix comparatively high in alumina and low in iron oxide will produce a strong cement, but will have a high melting point, a mix comparatively low in alumina and high in iron oxide will have a low melting point but will produce a weak cement. A mix having a silica modulus between 1.8 and 0.4, and having an iron modulus between 2.0 and 0.8 can be fused with carboniferous fuel and will yet produce a cement of commercial value, whereas a mix having an iron modulus considerably lower than 0.8, i. e., containing comparatively much iron oxide, will melt easily, but will produce a poor cement without commercial value.

Merely as examples and by no means limiting the field of the invention to such mixtures, the following compositions may be mentioned as most suitable for fusing and later cooling and grinding in order to obtain a highly hydraulic cement.

Example I

| | | |
|---|---|---|
| Lime | CaO | 65% |
| Silica | $SiO_2$ | 20% |
| Alumina | $Al_2O_3$ | 6% |
| Ferric oxide | $Fe_2O_3$ | 9% |
| Hydraulic modulus | | 1.86 |
| Silica modulus | | 1.33 |
| Iron modulus | | 0.67 |

Example II

| | | |
|---|---|---|
| Lime | CaO | 58% |
| Silica | $SiO_2$ | 14% |
| Alumina | $Al_2O_3$ | 20% |
| Ferric oxide | $Fe_2O_3$ | 10% |
| Hydraulic modulus | | 1.38 |
| Silica modulus | | 0.47 |
| Iron modulus | | 2.00 |

The invention can be performed in any of the known furnaces of the shaft, blast, rotary, open hearth or reverberating, and other type. Gas, oil, coal, wood, electricity, or any other fuel or heat may be used. An ordinary open hearth or reverberating furnace, such as used in the glass and steel industries, large enough to contain 50–100 tons of material, and heated with gas, oil, or pulverized coal with devices to preheat the combustion air with waste heat, will probably in most instances be more efficient and simple and will require less fuel, power and labor than any other system.

A further important advantage of fusing as against sintering is based on the fact that the limits mentioned are comparatively very wide. Exact blending is absolutely imperative for sintering. It is not so important for fusing. The danger of having free lime in the cement and of thereby interfering with its soundness is very remote, because under normal conditions a raw mix containing an excess of lime would not melt in a flame of carboniferous fuel in an easy flow, whereas a molten cement containing less lime than the optimum will always be superior to a sintered cement because the reaction between the components is more thorough in the molten state than in a sintering condition.

All raw materials proper for the usual cement industry may be used, if necessary with the addition of such minerals which contain a high percentage of alumina or iron, as bauxite or low grade iron ore.

Wherever blast furnace slag or any other by-product of a burning or fusing process is available in an incandescent or hot state, it is obviously advantageous to use it without intermediate cooling.

It is desirable to stir the fused mass in order to obtain a homogeneous mixture of the various components and it is preferable to accomplish this by blowing air through to prevent any cooling effect or even to get a heating effect this air may be mixed with fuel in pulverized or fluid form as coal, oil or gas.

It has been proposed to fuse cement with less lime than in Portland cement, and correspondingly more silica, alumina and ferric oxide, but the products turned out to be of little hydraulic value and sometimes even disintegrated spontaneously into a crystalline perfectly inert powder, because of too large a proportion of silica or wrong proportion between alumina and ferric oxide, as explained above.

It has also been proposed to make a sintered Portland cement having a hydraulic modulus of at least 1.7, preferably 1.8 or more by decreasing the content of silica, and increasing the content of alumina and ferric oxide accordingly. But this referred to Portland cement, i. e., cement high in lime and sintered, and has been done in order to obtain high initial strength. It has nothing in common with the present invention except the ratio between silica, alumina, and ferric oxide in the mixture.

It has further been proposed to fuse cement (alumina cement) containing 25–50% aluminum, less than 15% silica, and 25–55% lime under reducing combustion conditions, for instance in a shaft or blast furnace with an excess of coke. The present invention differs radically from this by a lower content of alumina, a higher content of silica, and in some cases a higher content of lime. Besides that, the excess of carbon will necessarily cause partial reduction of silica and ferric oxide, with a detrimental effect as to hydraulic quality and color of the final product, as mentioned above.

Having thus described my invention, what I claim as new and desire to secure by Letters Patent is:

1. The process of making a special cement having highly hydraulic properties, including fusing in a non-reducing atmosphere a mixture including lime, silica, alumina and ferric oxide, the ratio of lime to silica plus alumina plus ferric oxide being between 2.15 and 1.25, and the ratio of silica to alumina plus ferric oxide being between 1.5 and 0.6, and blowing air through the fused mass to agitate the same.

2. The process of making a special cement having highly hydraulic properties, including fusing in a non-reducing atmosphere a mixture including lime, silica, alumina and ferric oxide, the ratio of lime to silica plus alumina plus ferric oxide being between 2.15 and 1.25, and the ratio of silica to alumina plus ferric oxide being between 1.5 and 0.6, and blowing air and finely subdivided fuel through the fused mass to agitate and heat the same.

3. A fused cement including the following ingredients in substantially the proportions stated: lime 58%, silica 14%, alumina 20%, and ferric oxide 10%.

4. A fused cement including the following ingredients in substantially the proportions stated: lime 65%, silica 20%, alumina 6%, and ferric oxide 9%.

5. A fused cement including the following ingredients in substantially the proportions stated: lime 58% to 65%, silica 14% to 20%, alumina 20% to 6%, and ferric oxide 10% to 9%.

6. A fused cement having high hydraulic properties and including lime, silica, alumina and ferric oxide, the ratio of lime to silica plus alumina plus ferric oxide being between 2.25 and 1.4, the ratio of silica to alumina plus ferric oxide being between 1.5 and 0.6, and the ratio of alumina to ferric oxide being between 2 and 0.5.

7. A fused cement having high hydraulic properties and including lime, silica, alumina and ferric oxide, the ratio of lime to silica plus alumina plus ferric oxide being between 2.25 and 1.4, the ratio of silica to alumina plus ferric oxide being between 1.2 and 0.8, and the ratio of alumina to ferric oxide being between 1.2 and 0.8.

8. A fused cement having high hydraulic properties and including lime, silica, alumina and ferric oxide, the ratio of lime to silica plus alumina plus ferric oxide being between 2.25 and 1.4, the ratio of silica to alumina plus ferric oxide being between 1.8 and .5, and the ratio of alumina to ferric oxide being between 1.2 and 0.8.

Signed at New York in the county of New York and State of New York this 20th day of June A. D. 1929.

BRUNO BRUHN.